No. 852,352.

PATENTED APR. 30, 1907.

F. L. SHELDON.
CASH REGISTER ATTACHMENT.
APPLICATION FILED MAR. 30, 1906.

Witnesses
J. M. Fowler Jr.
A. L. Kitchin.

Inventor
Fred L. Sheldon
By
Mason, Fenwick & Lawrence
his Attorney

No. 852,352. PATENTED APR. 30, 1907.
F. L. SHELDON.
CASH REGISTER ATTACHMENT.
APPLICATION FILED MAR. 30, 1906.
6 SHEETS—SHEET 5.

UNITED STATES PATENT OFFICE.

FRED L. SHELDON, OF TACOMA, WASHINGTON.

CASH-REGISTER ATTACHMENT.

No. 852,352.                    Specification of Letters Patent.           Patented April 30, 1907.

Application filed March 30, 1906. Serial No. 308,988.

*To all whom it may concern:*

Be it known that I, FRED L. SHELDON, a citizen of the United States, residing at Tacoma, in the county of Pierce and State of Washington, have invented certain new and useful Improvements in Cash-Register Attachments; and I do hereby declare the following to be a full, clear, and exact description of the invention, such as will enable others skilled in the art to which it appertains to make and use the same.

This invention relates to improvements in cash register attachments and more particularly to phonographic attachments, for cash registers.

The invention comprises phonographic means for producing verbal sounds, upon the operation of the keys located on the cash register proper.

It also comprises means for producing different audible sounds as may be desired, upon operating the cash register keys.

The invention also comprises a series of sounding parts located at any convenient place on the usual cash register and has in conjunction therewith a stylus and record for producing verbal sounds.

The invention also further comprises means for producing a quick, verbal sound or an approximately slow, verbal sound as may be desired upon the operation of the keys located in the cash register proper.

The object in view is the production of means for producing verbal sounds upon the operation of the keys located in the usual cash register.

Another object is the production of means for giving different verbal announcements on the operation of the different keys of the cash register.

A further object in view is the production of the phonographic attachment for cash registers that will give a quick or slow verbal announcement upon the operation of any of the keys of the cash register.

A still further object is the production of a cash register attachment which is adapted to produce verbal announcements at the same time that the visual announcements are displayed or the production of the verbal announcements after the visual announcements have been displayed.

With these and further objects in view, the invention comprises certain novel constructions, combinations and arrangements of parts as will be hereinafter fully described and claimed.

In the accompanying drawing.

Figures 1, 2:
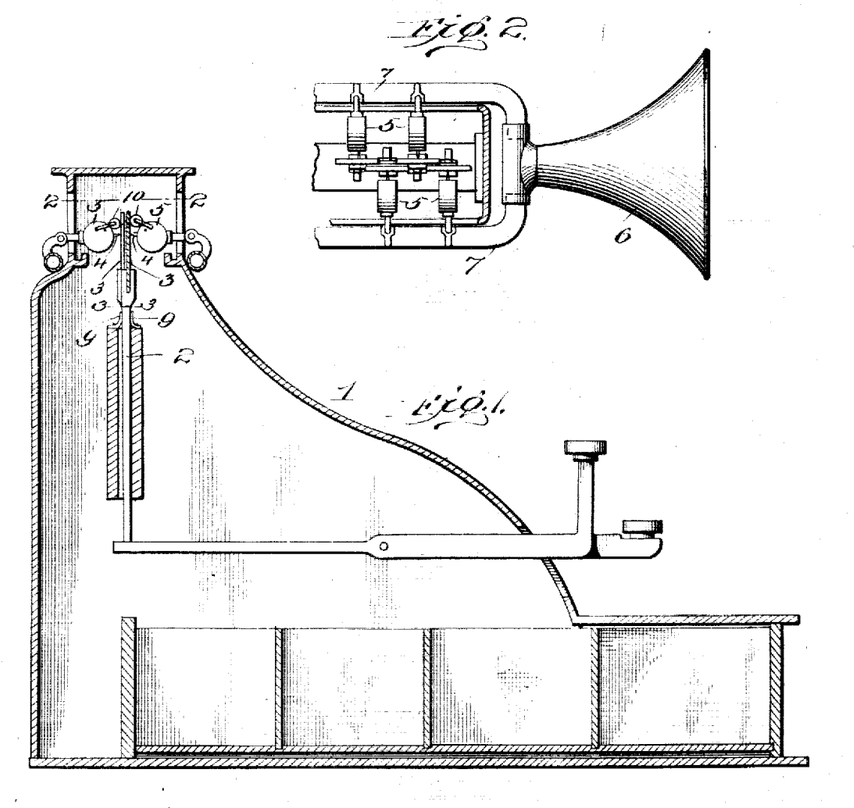
—Figure 1 is a vertical section through an ordinary cash register having one embodiment of my invention attached.
Fig. 2 is a fragmentary, sectional view taken on line 2—2 of Fig. 1.

In the preferred embodiment of my invention, 1 indicates an ordinary cash register, and 2 the ordinary rod carrying the usual visual signs or indications 3. On this visual sign or indicator 3 is located a record of the usual and well known type. Contacting with the records carried by these signs or display cards 3, is a stylus 4 attached to an ordinary sounding board 5, 5, for transmitting sound to the discharge horn 6 through a system of piping 7, 7, as will be observed from Fig. 1, when one of the keys of the cash register is depressed for releasing the locking mechanism of the drawer, the usual sign of display card 3 is projected into view, displaying the amount purchased and at the same time the record attached to the display card is passed by the stylus 4, and contacts therewith in its upward movement and thus produces a verbal announcement of any subject matter that may have been placed on that particular record. As the announcement is taken from the record it passes through the sounding board 5, a system of pipes 7 and finally out the horn 6 which is pivotally mounted upon the system of pipes 7 so as to be placed at any angle that may be desired. The record as it travels upward contacts with the stylus and produces the sound desired, but on its downward travel it is prevented from contacting by a special mechanism, which will be fully described hereinafter, so that each time the key is operated and the display card is raised, a verbal announcement is made, but no sound is made upon the return of the card to its lowered position. As will be seen in Figs. 1 and 3 the rod 2 travels in a guideway 8 which permits a slight horizontal movement, but said movement is dampened by the spring 9. As the card 3 is lowered to its original position, it comes in contact with a wheel 10 preferably made from rubber. This wheel 10 is mounted upon the sounding boards 5—5 by means of a lever 14, so that it will be permitted to always remain in contact with the card carrying the record. The wheel 10 is limited in its movement by projections 12 and 13, so as to prevent the possibility of the wheel from being thrown out of position by the careless use of the register.

Figure 4:
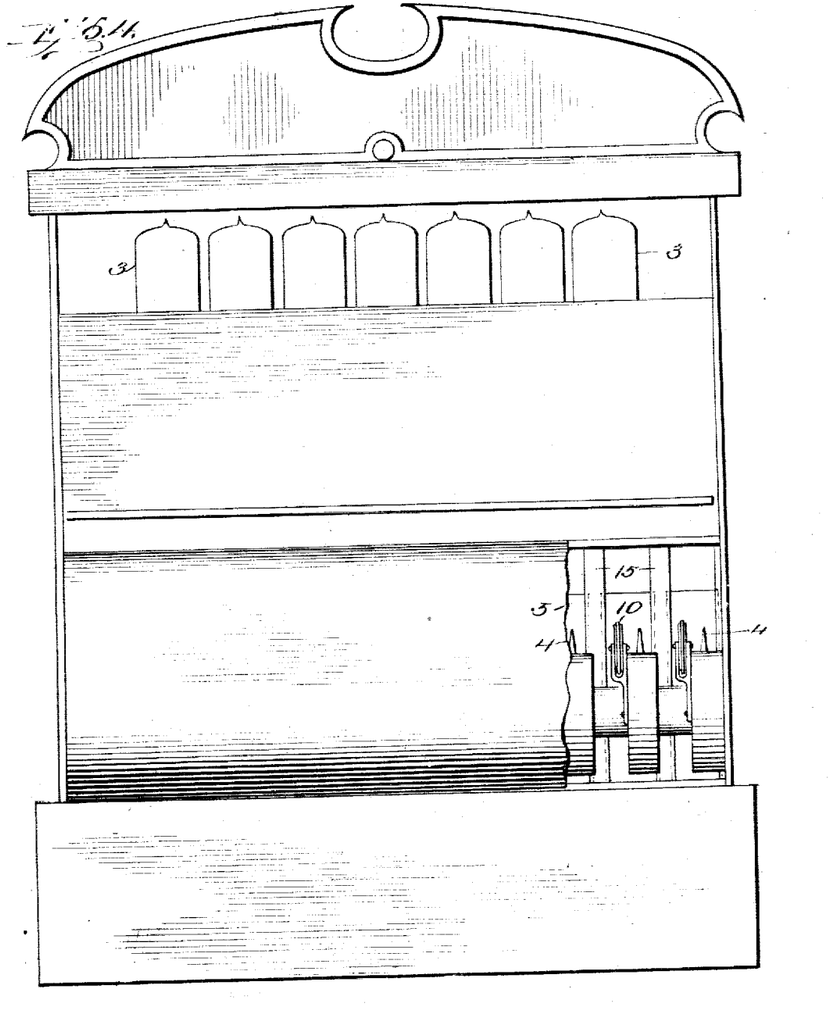
Fig. 4 is a rear elevation of the cash register certain parts being removed to show the construction and relative position of my attachment with the mechanism of the register.
Figure 5:
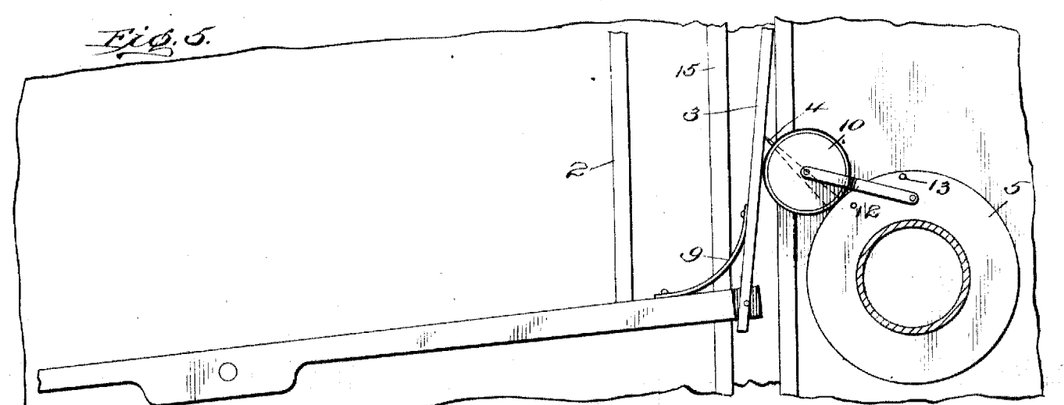
Fig. 5 is an enlarged, detail view of the record, sounding board and surrounding parts, the record being shown in its elevated position.
Figure 6:
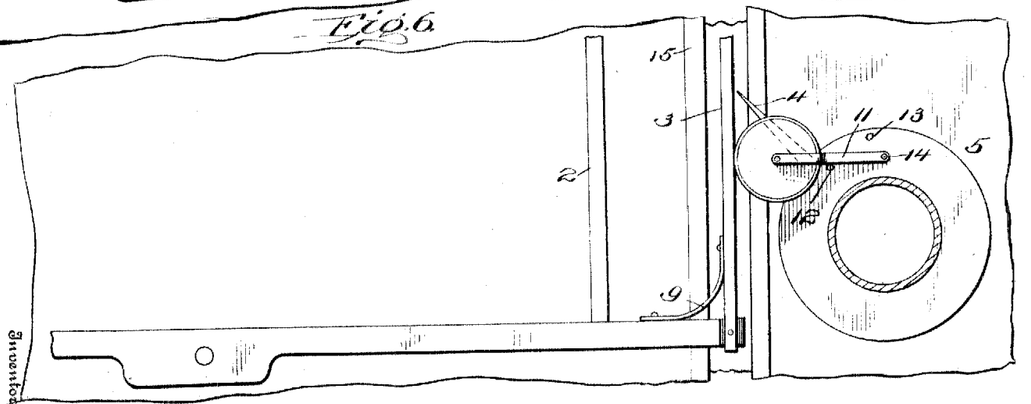
Fig. 6 is an enlarged, detail view of a record, sounding board and surrounding parts with the record in its lowered position ready to be operated upon.

As will be more clearly seen in Figs. 5 and 6 which shows a slight modification of how the record is connected to the keys of the register, the wheel 10 effectually prevents the records 3—3 from contacting with the stylus in its downward movement. When the key is depressed the record will be raised and the wheel will immediately pivot upon its securing journal 14 and thus be automatically removed so as to permit the record to come in contact with the stylus 4—4. The spring 9, as will be seen in Fig. 4 normally tends to hold the record against the stylus and does so during the upward travel of the record, but the wheel 10 overcomes the action of the spring during the downward movement and holds the record from contact with the stylus.

Figure 3:
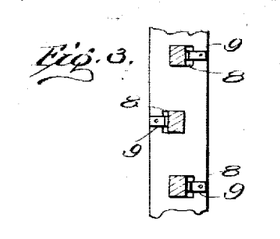
Fig. 3 is a fragmentary, detail, sectional view on line 3—3 of Fig. 1.

In Figs. 5 and 6 is shown the same mechanism as disclosed in Fig. 3, except that the record is pivotally secured to the keys of the register instead of being secured to the card carrying rod 2. By thus securing it to the end of the keys it is necessary to place the springs 9—9 so as to bear directly against the back of the records 3—3. As will be clearly seen from these figures when any of the keys of the register are depressed, one of the records 3 will be raised and at the same time forced against the stylus 4 and thus produces a sound which is carried through the sounding board 5 and finally out the horn 6.

In the form shown in Figs. 4, 5 and 6, the records are guided in suitable guideways as 15 which are of sufficient length to accommodate the vertical movement of said record.

Figure 7:
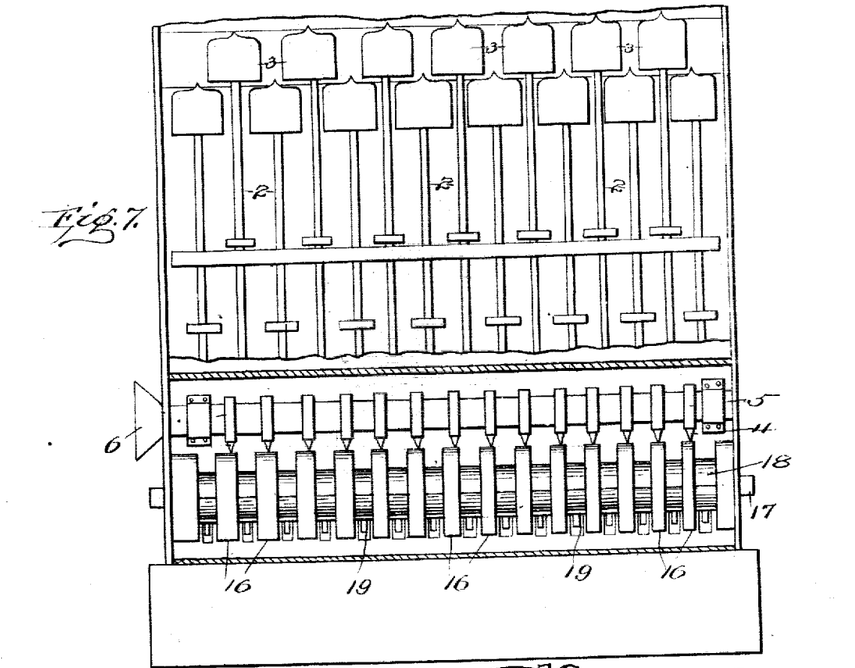
Fig. 7 shows a rear elevation of a cash register with a modification of my invention attached thereto, parts being broken away to show the relative position of my invention and working parts of the register.
Figure 8:
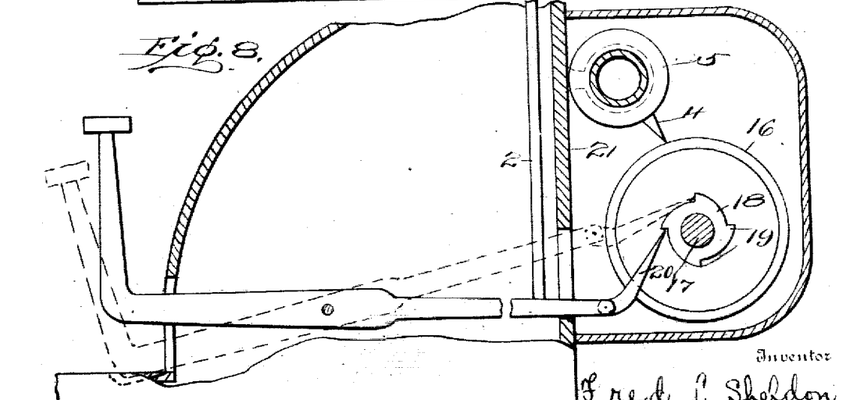
Fig. 8 is a detail, vertical, sectional view showing how my modified form of record is operated by the cash register key.

Another embodiment of my invention as will be seen in Figs. 7 and 8 shows the use of a cylindrical record 16 instead of the flat record secured to the cards 3. In this embodiment of my invention, I secure my attachment at any convenient place on any of the usual registers now in use but preferably secure the same at the rear as will be clearly seen in Fig. 8. The records 16 are secured to a suitable shaft as 17 and are spaced apart a suitable distance by a ratchet wheel 18 having any suitable number of teeth as 19 formed therein. Around the periphery of the record 16 is located as many expressions as there are teeth formed on the ratchet wheel 18. In this way when the key of the cash register is operated the ratchet wheel 18 is partially rotated by means of a pawl 20 secured to the end of the key and this rotation is only such as to cause the stylus 4 to travel over one of the expressions located in the record 16. The stylus 4 with its sounding board 5 is located at any suitable point preferably above the record and is secured in place by any suitable bracket as 21. From this arrangement of record and means for operating the same, it is possible to have four similar expressions on one record or four different expressions on one record and thus one key of the cash register will cause the announcement of four different verbal expressions.

Figures 9, 11:
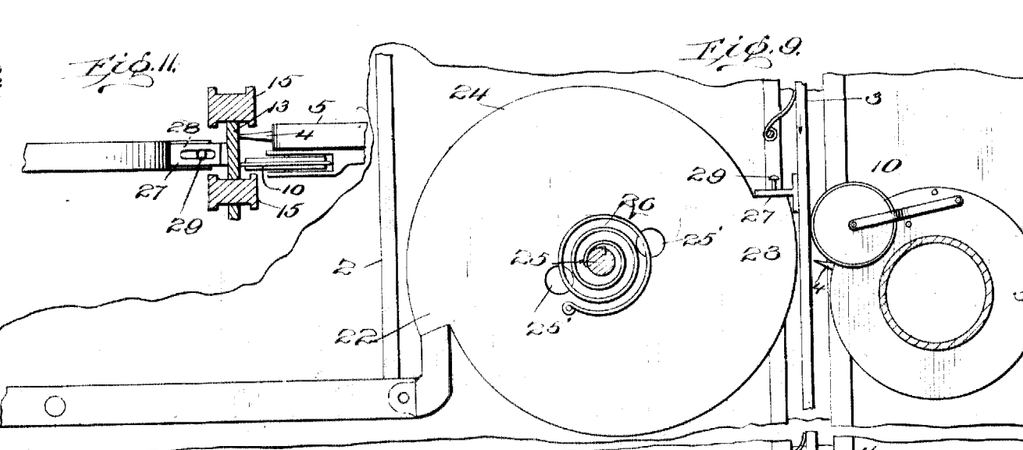
Fig. 9 is another modification of means for operating the record of my attachment.
Fig. 11 is a detail, fragmentary, sectional view of the record and surrounding parts taken on line 4, 4 of Fig. 10.

My invention is preferably secured to the back of the register and on the outside so as not to interfere with the usual workings of the register, so that when the key is depressed, the visual sign is displayed in the usual manner as well as the operation of my invention. One modification of my invention will be seen disclosed in Fig. 9 which shows the sounding board 5, stylus 4 and wheel 10, common to the other embodiments of my invention but a slightly different form of means for reciprocating the record 3. In this modification, the means used for reciprocating the record 3 is arranged so that when the key of the register is depressed, it will lower the record to its lowest position. The means for accomplishing this result comprises a pair of levers or cams 22 and 23 formed on a disk 24, which is mounted upon a stationary shaft 25. A spiral spring 26 is secured at one end to the stationary shaft 25 and at the other end to the rotating disk 24 so that when the disk 24 is revolved by means of the key of the cash register forcing the lever 22 upward, the spring is slightly wound or brought under tension. When the key of the register is allowed to fall into its usual position, the disk 24 will begin to revolve slowly under the force exerted upon it by the spring 26 and thus force upward the record 3, which is at this moment contacting with the stylus 4. Secured to the record 3 is a bracket or arm 27 which has formed therein a slot 28 through which a bolt or other securing means as 29 is passed and secured to the lever 23. By this construction of bracket and slot therein the record 3 may be allowed to oscillate or swing into and out of contact with the stylus 4 so as to cause a sound to be emitted only when the record is traveling upward. The spring 26 is made of suitable strength to cause the disk 24 to revolve slowly and thus force the record 3 slowly past the stylus 4 and in this way produce verbal sounds slowly or in as rapid succession as may be desired. The spring 26 may be either strengthened or weakened to increase the speed of the travel of the record 3 or if desired, other means may be employed for damping the effect of the rotation of the disk 24 as for instance, a flat spring 24' in frictional contact with the side of the disk 24. The disk 24 is preferably provided with a number of apertures 25' upon which it may be mounted so as to increase or decrease the throw of the record 3.

Figure 10:
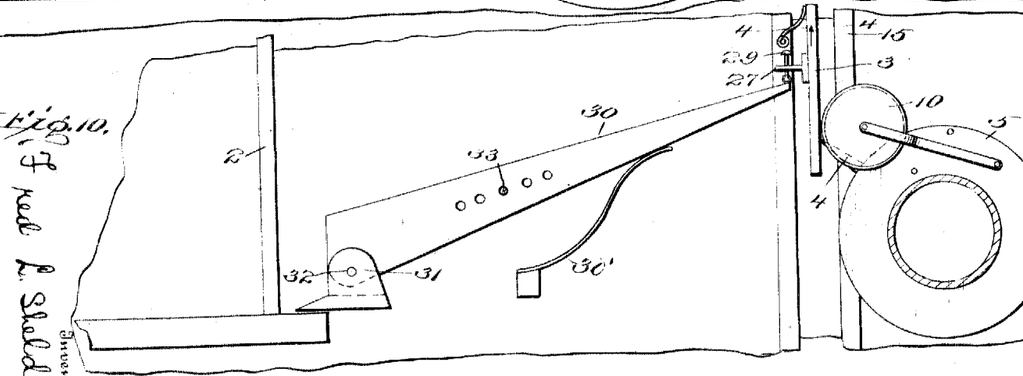
Fig. 10 is a still further modification of means for operating the record.

A still further modification within the spirit of this invention will be seen disclosed in Fig. 10. In this figure the stylus 4, sounding board 5 and wheel 10 together with the guides 15 are common to all the views. The modification consists in the particular way in which the record 3 is operated. In this view the record 3 is provided with the bracket 27 and connected to an operating arm 30 by means of the bolt 29. Lever or arm 30 is pivoted so as to have the greater weight at the end opposite the record. On the end opposite the record is located a connection 31 which connects the lever 30 with the usual key of the cash register. This connection is pivoted at 32 so that when the key of the register is operated the lever 30 will be pivoted so as to raise the connection 31, and depress the record 3. When the connection 31 is raised to its highest position, the key of the register will slide off the under portion of the connection 31 which will permit the lever 30 to resume its original position. The lever 30 is so mounted on its pivot as to have more weight on the end to which 31 is secured, so that when the key of the register is out of contact therewith, it will immediately begin to descend and consequently to force upward the record 3. The speed of the travel of the record as will be observed may be regulated by the position of the pivot 33 so as to give more or less weight on the end of the lever on which the connection 31 is positioned. By this construction the record may be so regulated as to give a quick or slow sound as may be desired and also so as not to interfere in any way with the operation of the rods 2 of the usual mechanism of the register.

In order to make the record 3 travel a longer or shorter distance, it is only necessary to move the pivot 33 toward or away from the record, the spring 30' assisting the weight to raise the record 3 to its original position. This spring 30' is so positioned near the end opposite the connection 31 as to bear upon the lever 30 in case a longer throw is desired to be given to the record 3 and it is undesirable to increase the weight of the end of the lever carrying the connection 31.

Figures 12, 13:
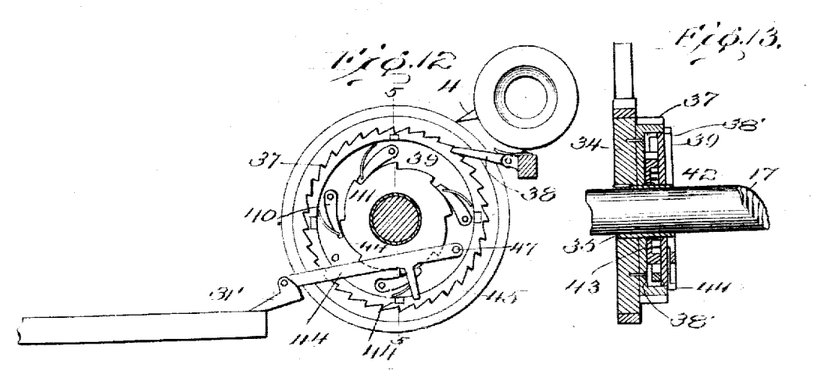
Fig. 12 is a side elevation of a modified form of record moving mechanism.
Fig. 13 is a vertical section on line 5, 5 of Fig. 12.
Figure 14:
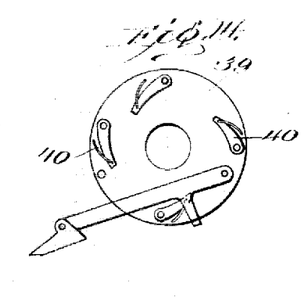
Fig. 14 is an elevation of the pawl carrying disk shown in Figs. 12 and 13, the disk being pictured transparent in order to better disclose the parts.

In Figs. 12, 13 and 14, I show another form of means for operating the record 16. In this modification, the record 16 is mounted upon a cylinder 34 in any convenient manner. The cylinder 34 is keyed or otherwise rigidly secured to a sleeve 35, so that when the said sleeve is revolved, the record will in turn be caused to pass beneath the stylus 4. Rigidly secured to one side of the cylinder 34 is a ratchet wheel 37, which is engaged by a pawl 38 for permitting it, together with the record, to revolve in but one direction. The ratchet wheel 37 is preferably made with a concaved or cut-out portion 38' in which is located another ratchet wheel 41 which is also rigidly connected with the cylinder 34. In fact the preferred construction of these three parts, cylinder 34, ratchet wheel 37 and ratchet wheel 41 is to make them of one solid piece of material. In such case no sleeve would be necessary unless to prevent wear. On the outside of ratchet wheel 41, or the solid cylinder, composed of the three parts above referred to, and not connected with them, but acting separately and revolving upon shaft 17 is disk 39. This disk 39 carries any suitable number of pawls as 40 which are spring pressed and normally tend to engage the ratchet wheel 41, which is rigidly secured to the cylinder 34, as above stated. Attached to disk 39 is a spiral spring 43. This spring is secured at one end to the shaft 17 which is stationary, and at the other end to the disk 39. Thus when the disk 39 is revolved in one direction, the spring 43 will be brought under tension and when it is released, the spring will revolve the disk 39 with its pawls 40 in the opposite direction. The pawls 40 then engage the teeth of the ratchet 41 and revolve the same carrying with it the cylinder or record carrying drum 34. As will be observed from Fig. 12, the pawls 40 are positioned on the quarter, that is, in such a manner as to permit one of the said pawls to engage one of the teeth on the ratchet wheel 41 while the pawl just back of the engaging pawl is positioned a slight distance from the tooth which it tends to engage. The remaining pawls are positioned still further back from the teeth which they tend to engage. The pawls 40 are positioned in this manner so as to be capable of engaging the ratchet wheel 41 at practically any point and thus substantially overcoming any lost motion. Upon the ratchet wheel 37 is positioned any suitable number of projections 44 spaced preferably an equal distance apart, and are adapted to be engaged by a projection 45 formed integral with a lever 46, which is operated by the usual key mechanism of a cash register. This lever 46 is pivotally secured at 47 to the disk 39, and when revolved upon the pivot 47, engages the lug or projection 48 after it has traveled a sufficient distance to disengage the lug 45 from the projection 44. When the lever 46 has come into contact with the projection 48, it will, on its further upward travel, revolve the disk 39 in such a direction as to bring under tension the spring 43. Upon the end of the lever 46, is positioned a suitable connecting link 31' which is pivotally secured thereto in any convenient manner. When the mechanism of the cash register is operated, it will force the lever 46 upwardly until the connection 31' falls off of the end of the cash register mechanism. The lever then will drop into the position shown in Fig. 12 and will prevent the ratchet 37 which is secured to the record carrying drum, from revolving more than a certain predetermined distance by means of the interposition of the lug 45, so as to come into contact with one of the lugs 44. When the lever 46 drops to its lowered position, the disk 39 is thus released and allowed to be revolved in the reverse direction by the spring 43. When it begins to revolve under the force of said spring, the pawls 40 will engage the ratchet wheel 41 and revolve the same and carrying with it the cylinder or record carrying drum 34 until stopped by the interception of projection 45 with lug 44. From this construction, it will be evident that any number of statements may be placed upon the record and sounds transmitted therefrom as may be desired. As shown in the drawings, only four expressions will be uttered upon the operation of the cash register mechanism. In case more or less expressions are desired to be placed on the record, a larger or smaller number of lugs 44 will be provided. Disk 39 shown in Fig. 14 is placed on the outside of ratchet wheel 41, but within the concave portion of ratchet wheel 37. It fits there snugly. The pawls 40 are on the inside of said disk 39 standing in the same position as shown in the drawings. In both Figs. 12 and 14 this disk 39 is pictured as transparent to show the positions of the pawls 40 and ratchet wheel 41.

I have disclosed the preferred form of construction and means for producing the results set forth but as will be evident more charges and modifications may be made without departing from the spirit of the invention. For instance, there may be a number of other ways of holding the record against the stylus on its upward travel, as well as different ways for holding the same from contacting with its downward travel. Also it is evident that other ways for causing a record to travel at a greater or less speed may be used than specifically disclosed in this application, but still within the spirit of the invention. I shall consider myself at liberty to use these different forms of minor changes and modifications all within the spirit of the invention and still be protected in the use of the same.

Having now described my invention, what I claim as new and desire to secure by Letters Patent is:—

1. The combination with a cash register having a plurality of keys adapted to be manually operated, of a phonograph attachment comprising a plurality of records, and means connecting the keys with and to actuate the records.

2. The combination with a cash register having a plurality of keys adapted to be manually operated, of a phonograph attachment comprising a plurality of records equaling in number the keys, and means connecting the keys with and to actuate the records.

3. The combination with a cash register having a plurality of keys adapted to be manually operated, of a phonograph attachment comprising a plurality of records, and means connecting each of the keys with and to operate one of the records.

4. The combination with a cash register having a plurality of keys adapted to be manually operated, of a phonograph attachment comprising a plurality of rotatable records, and means connecting the keys with and to actuate the records.

5. The combination with a cash register having a plurality of keys adapted to be manually operated, of a phonograph attachment comprising a plurality of records; means connecting the keys with and to actuate the records, means engaging said records for producing sound vibrations, and means adapted to disengage the vibration producing means and the records at times.

6. The combination with a cash register having a plurality of keys adapted to be manually operated, of a phonograph attachment comprising a plurality of records, means connecting the keys with and to actuate the records, means engaging said records for producing sound vibrations, and means adapted to disengage the vibration producing means and the records during return movement of the records.

7. The combination with a cash register having a plurality of keys adapted to be manually operated, of a phonograph attachment comprising a plurality of records, and means connecting each key with and to actuate a record independently of the other records.

8. The combination with a cash register having a plurality of keys adapted to be manually operated, of a phonograph attachment comprising a plurality of records, means connecting each of the keys with and to actuate one of the records independently of the other records, means engaging said records for producing sound vibrations, and means adapted to disengage the vibration producing means and records at times.

9. The combination with a cash register having a plurality of keys adapted to be manually operated, a phonograph attachment comprising a plurality of records, means connecting each of the keys with and to actuate one of the records independently of the other records, means engaging said records for producing sound vibrations, means to normally hold the record in engagement with the vibration producing means, and means adapted to disengage the vibration producing means and records at times.

10. The combination with a cash register having a plurality of keys adapted to be manually operated, of a phonograph attachment comprising a plurality of records, means connecting each of the keys with and to actuate one of the records independently of the other records, means engaging said records for producing sound vibrations, means to normally hold the records in engagement with the vibration producing means, and means adapted to disengage the vibration producing means and records during the return movement of the record.

11. The combination with a cash register having a plurality of keys adapted to be manually operated, of a plurality of records equaling in number the keys, means connecting each of the keys with and to actuate one of the records independently of the other records, means engaging said records for producing sound vibrations, a spring adapted to hold the record in engagement with the vibration producing means, and means adapted to disengage the spring during a return movement of the record.

12. The combination of a cash register having a plurality of keys adapted to be manually operated, of a plurality of rotating records equaling in number the keys, means connecting each of the keys with and to actuate one of the records independently of the other records, and means adapted to vary the rate of movement of the records.

13. The combination of a cash register having a plurality of keys adapted to be manually operated, of a phonograph attachment comprising a plurality of rotatable records, means connecting each of the keys with and to rotate one of the records independently of the other records, and a weighted lever adapted to vary the movement of the records.

In testimony whereof I affix my signature in presence of two witnesses.

FRED L. SHELDON.

Witnesses:
R. H. LUND,
EMIL U. STENBERG.